Figure 1:
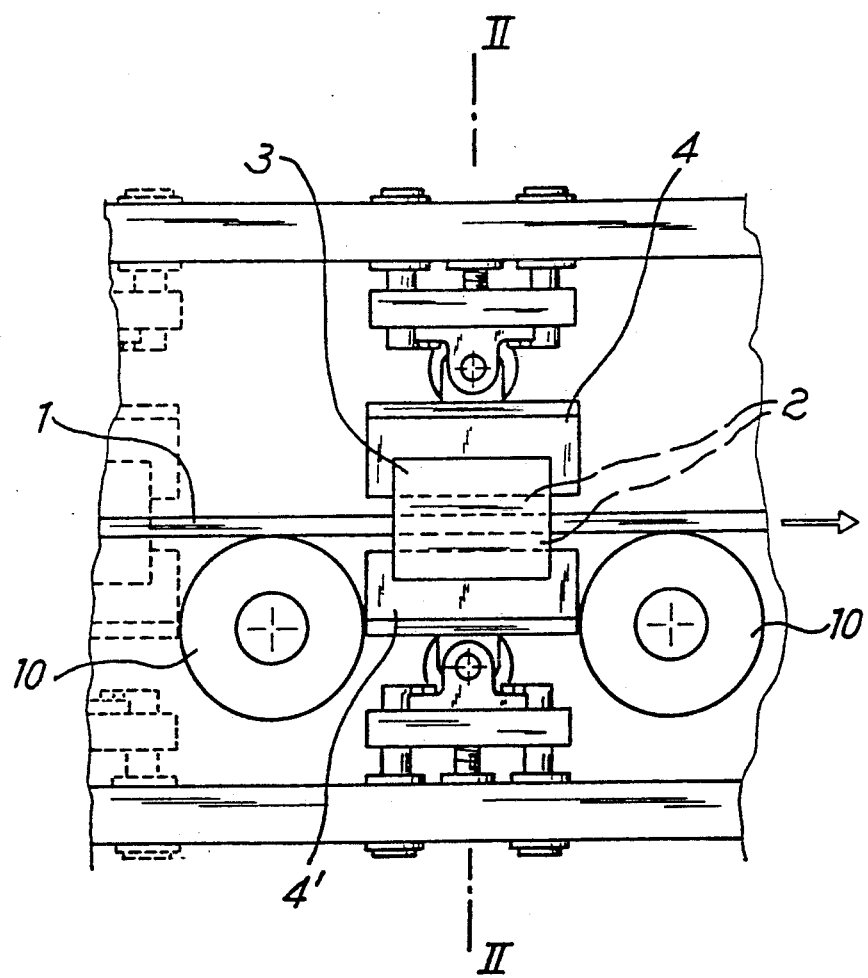

United States Patent [19]
Arvedi et al.

[11] Patent Number: 5,179,258
[45] Date of Patent: Jan. 12, 1993

[54] INDUCTION FURNACE FOR HEATING AND TEMPERATURE HOMOGENIZATION IN HOT-ROLLING OF THIN STEEL STRIPS

[75] Inventors: Giovanni Arvedi, Via Mercatello, 26; Giovanni Gosio, both of Cremona, Italy

[73] Assignee: Giovanni Arvedi, Cremona, Italy

[21] Appl. No.: 635,128

[22] PCT Filed: May 17, 1990

[86] PCT No.: PCT/IT90/00053
§ 371 Date: Mar. 14, 1991
§ 102(e) Date: Mar. 14, 1991

[87] PCT Pub. No.: WO90/14742
PCT Pub. Date: Nov. 29, 1990

[30] Foreign Application Priority Data
May 17, 1989 [IT] Italy ................ 20534 A/89

[51] Int. Cl.⁵ .................................. H05B 6/44
[52] U.S. Cl. .................... 219/10.61 R; 219/10.71; 219/10.79
[58] Field of Search ............ 219/10.61 R, 10.75, 219/10.79, 10.69, 10.71

[56] References Cited
U.S. PATENT DOCUMENTS

| | | | |
|---|---|---|---|
| 3,444,346 | 5/1969 | Russell et al. | 219/10.61 R |
| 4,185,183 | 1/1980 | Kamimoto | 219/10.61 R |
| 4,357,512 | 11/1982 | Nishimoto et al. | 219/10.79 |
| 4,795,872 | 1/1989 | Hagisawa et al. | 219/10.61 R |
| 4,891,484 | 1/1990 | Waggott et al. | 219/10.61 R |

FOREIGN PATENT DOCUMENTS

| | | |
|---|---|---|
| 3840812 | 4/1990 | Fed. Rep. of Germany . |
| 63-310592 | 12/1988 | Japan . |
| 593195 | 11/1947 | United Kingdom . |

*Primary Examiner*—Philip H. Leung
*Attorney, Agent, or Firm*—Browdy and Neimark

[57] ABSTRACT

An induction furnace is described which is capable to heat a thin strip from a continuous casting apparatus throughout the furnace itself after a previous rolling, at a homogeneous temperature adapted to the subsequent rolling steps. The induction furnace of the present invention comprises, in a known manner, an array of toroidal coils being fed at M.F., with intermediate feeding rollers having reduced size along the strip feed direction with respect to the known coils so that the rollers are less spaced from each other. Flux concentrators are also provided, being distributed preferably in pairs on the inductor and mounted transversely movable with respect to the strip forward movement and possibly also in a plane perpendicular thereto.

7 Claims, 2 Drawing Sheets

INDUCTION FURNACE FOR HEATING AND TEMPERATURE HOMOGENIZATION IN HOT-ROLLING OF THIN STEEL STRIPS

The present invention relates to an induction furnace for heating and temperature homogenization in hot-rolling of thin steel strips produced by continuous casting and already subjected to a preliminary rolling step.

It is generally known to use M.F. induction furnaces in steel industry. These furnaces are used, although not widely, as an alternative to the gas furnaces for heating of the slabs having a thickness of more than about 100 mm, whereas the use with strips having a thickness of less than about 30 mm is limited to a thermal treatment of the edges in order to oppose the natural cooling which, being greater than in the central zones, causes such a temperature decrease as to produce possible cracks at the strip edges. However this induction treatment of the edges is accomplished by means of C-shaped inductors which enclose, like sliding shoes, only the fringe areas of the strip during the forward movement and certainly cannot be considered true and actual induction furnaces.

On the contrary the induction furnaces for slabs comprise a row of inducing coils having a substantially toroidal shape, within which the slab is caused to move forward in sequence, between one coil and the other there being provided driven and/or idle rollers for feeding said slab. These coils have a size that in the direction of movement are in the order of about 900 mm.

On the other hand plants are provided at present for the continuous production of steel strip by the continuous casting method in order to have as final product the so-called "coil" or steel plates cut at prefixed lengths, wherein it is required that strips in an intermediate step of hot-rolling are heated with contemporaneous temperature homogenization in induction furnaces for reaching the required temperature in the final steps of rolling. In this respect reference should be made to the Italian Patent Application No. 20752 A/88, the PCT Application DE-88-00628 and German Patent Application No. P-3840812.0.

In this respect the adoption of known induction furnaces, already used for the slabs, cannot however give the expected results due to the fact that inconveniences would occur, being caused e.g. to the strip stumbling and possible hitting against the coils owing to its lower rigidity with respect to the slabs having a greater thickness. Furthermore the strip requires for temperature homogenization that in certain zones, possibly not always the same but such as to be localized at each time, the heating has to be stronger with a greater concentration of flux lines. As a matter of fact this is not required by the slabs, since the temperature is more homogeneous due to the greater thickness.

Therefore it is an object of the present invention to provide an induction furnace for steel strips from continuous casting having a thickness of less than 30 mm, as they have been already partially hot-rolled so as to heat homogeneously the strip up to the required temperature for the subsequent steps of rolling completion without facing the above-mentioned drawbacks.

The induction furnace according to the invention comprises an array of coils, each of which is embedded in an inductor unit, separately fed by one or more frequency converter and successively crossed by the strip being supported and driven through pairs of rollers between each coil and the subsequent one, the size of each coil in the forward direction of the strip being less than 500 mm, there being also provided flux concentrating devices which are distributed in pairs on each inductor, at least at one upper or lower side with respect to the plane defined by the strip itself.

Figure 2:
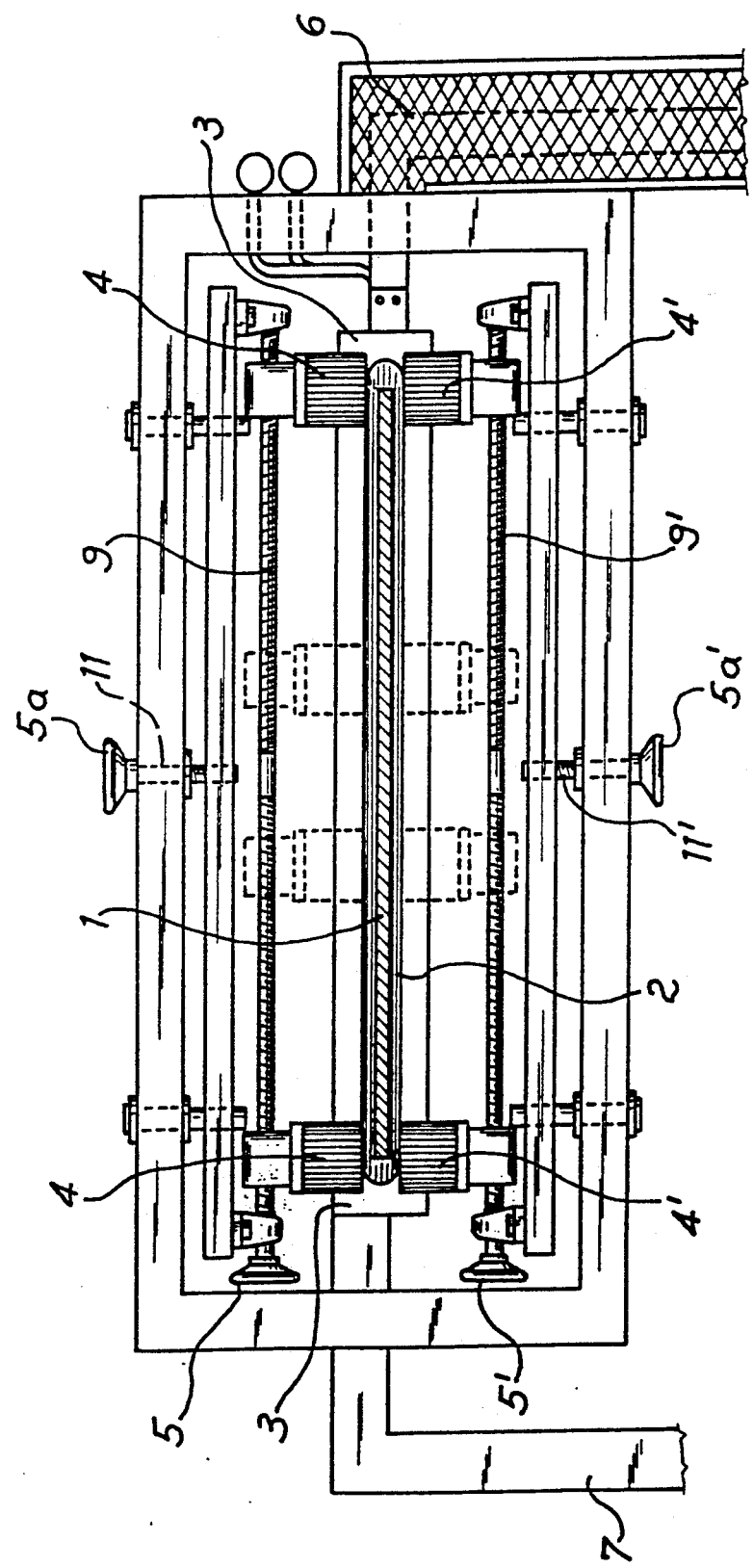

According to a preferred embodiment of the invention the flux concentrating devices are mounted movable in a transverse direction to the strip and preferably also perpendicularly to the strip itself for a better distribution of power in the areas where a stronger heating is required. These and additional objects, advantages and characteristics of the induction furnace according to the invention will be clear to the persons skilled in the art form the following detailed description of a preferred embodiment thereof, given by way of a non-limiting example, with reference to the annexed drawings in which:

FIG. 1 shows a partial, diagrammatic side view of a heating element of the furnace according to the present invention; and FIG. 2 shows a cross-section view taken along line II—II of FIG. 1.

With reference to the drawings, FIG. 1 schematically represents a portion of the furnace according to the invention along the forward direction of strip 1, as regards only one heating element of the furnace itself, comprised of a coil 2 having a substantially rectangular cross-section with rounded edges (better seen in FIG. 2) which is embedded within an inductor 3, as it is surrounded by refractory material. As better shown in FIG. 1 the strip 1 passes through the space defined by each coil 2 (the height of which will be not less than the maximum strip thickness which may be expected), as it is driven by rollers 10 positioned between each heating element or coil 2 and the subsequent one. The rollers 10 can be all motorized or some of them may be idle.

Through the inductor 3 embedding the coil 2, this is fed on one side by means of suitable conductors 6 usually called "bus bars" by a source of given power and frequency, in particular one or more converters (not shown). Advantageously the frequency will be fixed once and for all, and possibly the feeding power will be varied according to the energy required for heating, as a function both of the strip temperature upstream of the furnace and of its thickness with a finer regulation being responsive to the temperature at the outlet of the coil. At the opposite side of the feeding connector 6 there may be provided manifolds for the delivery and discharge of the cooling water generically designated 7 in FIG. 2 and connected to the inductor 3.

According to the present invention there are also provided flux concentrators 4 formed of packs of magnetic sheet iron for directing the primary electro-magnetic field flux so as tot concentrate it in a direction substantially parallel to the forward movement of the strip. In the area of strip 1 where the concentrated flux closes its circuit an induced current is produced, having a higher intensity and thereby greater heating. The flux concentrator have been represented as forming two pairs, an upper one and a lower one. The concentrators 4 pertaining to the upper pair correspond to the concentrators 4' of the lower pair, whereby the concentrators are coupled two by two on either side of the strip 1, as they are co-axial with an axis passing throughout strip 1 and coil 2. Flux concentrators 4 and 4' will be normally positioned in the proximity of the edges of strip 1, just where a greater heating power is required.

However preferably, as shown in FIG. 2, the flux concentrating devices are designed to be movable firstly in the transverse direction both to follow the dimensional variations of the strip in width and to be positioned also in correspondence of inner zones which may be at al owe temperature (cold spots), and possible also in a perpendicular direction to the plane defined by strip 1 for abetter positioning in the height direction in function not only of the strip thickness but also of the power to be concentrated.

As shown in the drawings, in particular in FIG. 2, the two pairs of flux concentrators 4, 4' are mounted, with each element opposite to the associated one of the other pair, to an inner nut thread on screws 9 operable from the outside by means of control handwheels 5, 5' respectively. The screws 9, 9' will have one half of their length with a thread to a direction and the other half with a thread oppositely directed, so that the movement of the two concentrators of each pair will be symmetric and self-centering at each operation of the associate handwheel. Additionally the screws 9 and 9' will be preferably mounted at their central portion to a lifting and lowering device which is also controllable by means of outer handwheels 5a, 5a'. Said handwheels may be for example fixed respectively to screws 11, 11' being perpendicular to the screws 9, 9', each of them passing through a hole at right angle to the longitudinal axis of the latter.

Of course a completely automatic control of the concentrators 4, 4' positioning may be provided, both in a transverse and in height direction. Instead of the operating handwheels, step by step motors will be used, being interlocked with a regulation and control unit adapted to process directly in real time the strip temperature, speed and thickness signals as received each time at the furnace inlet. In this way at each moment an optimal adjustment of the flux concentrators can be obtained for a better efficiency of the induction furnace according to the present invention.

EXAMPLE

For experimental purposes an induction furnace plant according to the invention was installed, having suitable longitudinal size of the coils and being provided with pairs of flux concentrators in association with each inductor. The main date of installed power number of inductors, frequency and size of the coil port in height, as well as of the results obtained with reference to the consumptions according to the strip cross-section and its feedings speed, efficiency etc. are listed in the following table also reporting the corresponding data for an induction furnace according to the prior art, namely of the type used for heating slabs, in which only the size of coils in the forward direction of the strip have been reduced without however the presence of the flux concentrators. As regards the consumptions it should be noted that they have been detected at the highest speed of the strip for temperature increases (ΔT) of about 150° C. and, at the lowest speed for ΔT of about 300° C.

TABLE

|  | With concentrators according to the invention | Without concentrators |
| --- | --- | --- |
| Installed power (MW) | 16 | 21 |
| Frequency (kHZ) | 6 | 10 |
| Number of inductors | 20 | 26 |
| Inductor port | 65 | 55 |
| (height in mm) Consumptions (Kwh/t — ΔT = 150° C.–300° C.) | | |
| 15 × 1050 mm v = 0,19 m/sec | 127 | 168 |
| 15 × 1050 mm v = 0,237 m/sec | 79 | 127 |
| 25 × 1330 mm v = 0,086 m/sec | 100 | 169 |
| 25 × 1330 mm v = 0,143 m/sec | 42 | 96 |
| 20 × 1330 mm v = 0,11 m/sec | 110 | 177 |
| 20 × 1330 mm v = 0,178 m/sec | 50 | 106 |
| Efficiency of inductors | | |
| 25 × 1330 | 80% | 79% |
| 15 × 1330 | 79% | 67% |

As it appears from the data given with the furnace plant according to the invention, not only a reduced installed power can be foreseen but lower consumptions of energy are obtained with the same cross-section and speed of the strip, as well as better efficiencies of the inductors.

Possible additions/or modifications can be made by those skilled in the art to the above described and illustrated embodiment of the induction furnace according to the present invention without departing from the scope of the invention itself. On the other hand no limitation will be expected as to the number of coils or heating elements in succession to each other which form the furnace.

What is claimed is:

1. An induction furnace for heating a steel strip (1) having a thickness lower than 30 mm and for rendering homogeneous the temperature up to a value required for the subsequent steps of hot rolling, said induction furnace comprising:

an array of coils (2) each having along its length a rectangular cross section and a slot corresponding to the width and depth of the steel strip (1), each of said coils embedded in a refractory material at the inside of an inductor unit (3), each said inductor unit (3) fed by one or more frequency converters (6), each of said coils (2) being crossed in succession by the steel strip (1), as it moves through the furnace, the steel strip (1) being supported and housed to continuously move through said slot in each of said coils (2) by rollers (10), one of said rollers (10) located before and after each of said coils (2) in the direction of movement of the steel strip (1), wherein said coils (2) are placed side by side with the length of each of said coils (2) being perpendicular to the longitudinal axis of the steel strip (1), wherein a magnetic field flux is generated in the plane of the steel strip (10 and parallel to its movement through said slot in each of said coils (2), wherein the width of each of said coils (2) in the direction of the steel strip (1) movement is less than 500 mm, and flux concentrator devices (4, 4') distributed in pairs on each said inductor (3) at least on an upper or lower side, with respect to the plane defined by the steel strip (1).

2. A furnace according to claim 1, wherein each of said flux concentrators (4, 4') is mounted substantially co-axial with the corresponding concentrator of the other pair at the opposite side of strip (1), each of said flux concentrators (4, 4') being formed of packs of magnetic sheet iron.

3. A furnace according to claim 1, wherein said flux concentrators (4, 4') are all positioned stationary in the proximity of the side edges of strip (1).

4. A furnace according to claim 1, wherein said flux concentrators (4, 4') are mounted movable in the transverse direction to the strip (1).

5. A furnace according to claim 1, wherein said flux concentrators (4, 4') are movable also in the direction perpendicular to the plane of strip (1).

6. A furnace according to claim 1, further comprising screw devices (9, 9'; 11, 11') for the adjustment of said flux concentrators, engaged to outer control handwheels (5, 5'; 5a, 5a').

7. A furnace according to claim 1 further comprising driving means for the automatic movement of said flux concentrators 4, 4' interlocked with a means for processing data of strip (1) speed, temperature and thickness as sensed by detecting means upstream of the furnace, as well as of the temperature at the outlet.

* * * * *